United States Patent Office 2,871,264
Patented Jan. 27, 1959

2,871,264

TETRACYCLINE EXTRACTIONS

Pasquale P. Minieri, Brooklyn, N. Y., and William M. Ziegler, Clementon, N. J., assignors to American Cyanamid Company, New York, N. Y., a corporation of Maine No Drawing. Application March 28, 1955
Serial No. 497,454

2 Claims. (Cl. 260—559)

This invention relates to improvements in the purification of antibiotics. More particularly, this invention is concerned with the extraction and purification of tetracycline from fermentation broth impurities by formation of tetracycline-quaternary ammonium complexes, and the regeneration of the pure antibiotic therefrom.

In copending patent application, Serial No. 382,637, filed September 28, 1953, now Patent No. 2,734,018, by Pasquale P. Minieri, Herman Sokol and Melvin C. Firman there is disclosed a process for recovering tetracycline by precipitation of the antibiotic from its fermentation impurities with quaternary ammonium salts such as alkyl trimethylammonium chloride and dialkyl dimethylammonium chloride. The precipitated complex is then extracted into an organic solvent such as chloroform or methyl alcohol and the purified antibiotic is regenerated as the acid salt by the addition of a mineral acid. By increasing the pH range of the acid salt solution to between about 3.0 and 7.0, isoelectric tetracycline base, as the trihydrate, is crystallized.

Tetracycline is a well-known broad spectrum antibiotic, capable of exerting antimicrobial activity against a large number of microorganisms including both gram-positive and gram-negative species. As a member of the broad spectrum class of antibiotics, tetracycline possesses considerable advantages, these being of particular interest to practicing physicians. Clinically, it results in a lower incidence of gastro-intestinal disturbances. Oral doses of this antibiotic cause a rapid rise in therapeutic serum levels which are easily maintained by continued oral administration.

Because of the great demand for this antibiotic by the medical profession, the pharmaceutical industry is continuously searching for ways and means to reduce manufacturing costs. Newly discovered antibiotics, such as tetracycline, are usually obtained initially through long and tedious fermentation and extraction processes which are not only expensive but also time consuming. As more knowledge regarding the chemistry and physical behavior of the antibiotic is accumulated, these long and laborious methods are gradually shortened, resulting in the elimination of many needless steps and the use of expensive organic solvents.

We have found that the extraction procedures disclosed in copending application Serial No. 382,637, now Patent No. 2,734,018, can be markedly improved by eliminating the use of organic solvents for extracting the tetracycline-quaternary ammonium complex. By completely omitting the use of organic solvents to solubilize the complex, we have overcome what has heretofore been accepted as a necessary requirement in the quaternary-type purification process of tetracycline. Our improved process thus not only simplifies an unduly complex procedure, but contrary to present belief, increases the yields of tetracycline.

In accordance with our process, whole or filtered tetracycline broth, or an aqueous slurry of mash solids is treated with a quaternary ammonium salt. The tetracycline-quaternary ammonium complex forms when the medium is at an alkaline pH range, but the quaternary salt may be added either at an alkaline or at an acid pH. The complex is then separated and the tetracycline is extracted with an aqueous acid solution at a pH of about 0.5 to about 3.0, preferably from about 1.0 to about 2.5. The acid salt of tetracycline which forms goes into solution, from which it precipitates as a crystalline product upon increase of the pH to the range from about 3.0 to about 7.0, precipitation starting at the lower value.

The order of addition of the quaternary ammonium compound and of alkalinization is not critical. However, if a low potency broth is being worked up, it is preferred that the quaternary ammonium compound be added first in order to insure maximum salt formation once the pH of the medium is increased. Thus, the quaternary ammonium compound may be added to filtered broth at an acid pH followed by pH adjustment to the alkaline range or it may be added to whole broth at acid pH followed by increase in pH to the alkaline range. Although the preferred pH range for complex formation is from about 8.0 to about 11.0, a range from pH 6.5 to 11.5 is operable.

The usual techniques known to those skilled in the art may be employed to enhance the speed of the process or to increase the yield or both. Thus, as those familiar with antibiotic purification procedures well know, crystal formation is enhanced by "seeding" the acidic solution with a few crystals of tetracycline base. This induces more rapid crystallization of the amphoteric substance. If the seeded solution is placed in a refrigerator overnight instead of remaining at room temperature, a rich crop of pure tetracycline crystals forms which can be readily separated by filtration and dried. Repeated seeding and refrigeration increase the yield somewhat. Further refinements and modifications may occur to those skilled in the art and it is intended that these be included within the scope of the present invention.

It is preferable to separate the precipitated complex with the aid of filter-aid material in order to ensure as complete a removal of the antibiotic as possible. We prefer to employ diatomaceous earth as the filter-aid material in our process. However, it is not necessary to adhere strictly to this substance inasmuch as any inert, chemically inactive material may be employed as for example, cellulose powder, starch, paper pulp, silica gel, powdered glass, powdered rubber or synthetic polymers. These materials are available on the open market under a variety of trademarked names.

The exact manner in which the tetracycline-quaternary ammonium complex forms is not presently known. However, inasmuch as the presence of certain polyvalent metallic ions such as calcium and magnesium is essential for complex formation, it is believed that the precipitate is organo-metallic in nature, the linkage between the tetracycline and the metallic ions being unknown. Since the crude fermentation broth, the filtered broth, or an aqueous slurry of mash solids may be employed as starting materials in the process of this invention, the required ions are inherently present in such materials. If a non-metallic solution or mixture of tetracycline is used, then a small quantity of calcium or magnesium ions may be added thereto, either in the form of salts or as fermentation impurities, in order to effect complex formation. These may be added either before or after the admixture of the quaternary ammonium salt.

Any strong mineral acid may be employed for cleaving the tetracycline-quaternary ammonium complex as for example, hydrochloric acid, sulfuric acid, or phosphoric acid.

The quaternary ammonium salts that are particularly useful in this recovery method are alkyl trimethylammonium chlorides wherein the long-chain alkyl radical contains from 8 to 22 carbon atoms, and dialkyl dimethylammonium chlorides wherein one of the two long-chain alkyl groups contains from 1 to 22 carbon atoms and the remaining long-chain alkyl group contains from 8 to 22 carbon atoms. This class of quaternary ammonium salts may be represented by the general formula:

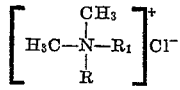

wherein R is a straight-chain alkyl radical containing from 1 to 22 carbon atoms, inclusive, and $R_1$ is a straight-chain alkyl radical containing from 8 to 22 carbon atoms, inclusive. Many of the compounds in this class are available commercially from the Armour Chemical Division of Armour & Co. under the trademark "Arquad." Members of the series vary as to the length and number of long-chain alkyl groups attached to the nitrogen atom, thus permitting some latitude in the selection of material best suited to the operator's purpose. The following table illustrates a group of Arquads which are available and which may be advantageously used in the present invention. Although the chlorides are the preferred and illustrated salts, the bromides, sulfates, and nitrates can be used when available.

ARQUADS [1].—AVERAGE COMPOSITION

| Substituent Groups | Carbon Chain Length | Arquad 12, percent | Arquad 16, percent | Arquad 18, percent | Arquad C, percent | Arquad S, percent | Arquad 2C, percent | Arquad 2HT, percent |
|---|---|---|---|---|---|---|---|---|
| Octyl | 8 | | | | 8 | | 8 | |
| Decyl | 10 | | | | 9 | | 9 | |
| Dodecyl | 12 | 90 | | | 47 | | 47 | |
| Tetradecyl | 14 | 9 | | | 18 | | 18 | |
| Hexadecyl | 16 | | 90 | 6 | 8 | 10 | 8 | 30 |
| Octadecyl | 18 | | 6 | 93 | 5 | 10 | 10 | 70 |
| Octadecenyl | 18 | 1 | 4 | 1 | 5 | 35 | | |
| Octadecadienyl | 18 | | | | | 45 | | |

[1] Arquads 2C and 2HT are dialkyl dimethylammonium chlorides. All others are alkyl trimethylammonium chlorides.

The compound which we prefer to use and with which we have obtained best results is Arquad 16, a mixture of alkyl trimethylammonium chlorides and dialkyl dimethylammonium chlorides in which the alkyl groups consist of 90% hexadecyl, 6% octadecyl and 4% octadecenyl in isopropanol. The alcohol constitutes about 50% of the preparation.

Another useful group of quaternary compounds which may be advantageously employed in the present invention are illustrated by the following structural formula:

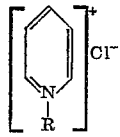

wherein R is an alkyl chain containing from 8 to 18 carbon atoms inclusive or an esterified chain of the type:

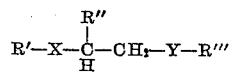

wherein R' is an alkyl chain from 8 to 18 carbon atoms, inclusive, R" is hydrogen, a methyl or ethyl radical, R''' is a methylene or dimethylene radical attached by C—N linkage to the quaternary nitrogen atom, and X and Y are interchangeably

or

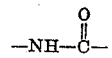

groups.

Still another group of quaternary ammonium compounds which have utility in our invention are those exemplified by the following general formula:

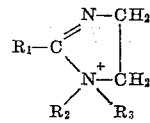

wherein $R_1$ represents an alkyl or alkenyl radical containing from 7 to 21 carbon atoms, inclusive, $R_2$ represents a hydroxyalkyl radical containing from 2 to 4 carbon atoms, inclusive, and $R_3$ represents an alkyl radical containing from 1 to 4 carbon atoms, inclusive. As is well known, these compounds are generally referred to as "imidazolinium chlorides." They are available commercially under the trademark designation "Quaternary O," "Quaternary S," etc., the "O" and "S" representing the length of the alkyl chain attached to the ring, e. g., oleyl, stearyl, etc. The preferred quaternary compound in this series is "Quaternary O" which is 1-methyl-1-(2-hydroxyethyl)-2-oleyl-imidazolinium chloride.

The invention is illustrated by the following examples which are intended merely to exemplify, not to limit, the scope of this invention.

*Example I*

Six liters of tetracycline whole broth were acidified to pH 2.0 with sulfuric acid, and 75 ml. of Arquad 16 added. The mixture was agitated 15 minutes, filtered with diatomaceous earth, the cake washed, and the wash water added to the filtrate. The combined filtrate and wash was then adjusted to pH 8.8 with 10 N sodium hydroxide, agitated 15 minutes, and filtered with diatomaceous earth. The cake was washed with water, then slurried in 150 ml. of water and acidified to pH 1.5 with sulfuric acid. This mixture was agitated 15 minutes and filtered, the cake washed and the wash water added to the extract. The pooled extract and wash was adjusted to pH 3.8 with ammonium hydroxide and seeded with crystalline isoelectric tetracycline. The resultant mixture was agaitated two hours and stored overnight in the refrigerator. The mixture was then filtered, the cake washed with n-butanol and water, and air dried. There was obtained 35.3 grams of tetracycline base, assaying 824 mcg./mg.

*Example II*

Four liters of tetracycline whole broth were acidified to pH 2.0 with sulfuric acid and agitated 15 minutes. 52 ml. of Arquad 16 was added, the mixture adjusted to pH 9.3 with 4 N sodium hydroxide, agitated 15 minutes and filtered with diatomaceous earth. The cake was washed with water. One-half of the filter cake was slurried in 200 ml. of water and the mixture acidified to pH 1.5 with 4 N sulfuric acid. The mixture was agitated 15 minutes and filtered, the cake washed with water, and the wash added to the extract. The combined wash and extract was adjusted to pH 4.0 with ammonium hydroxide, seeded with crystalline isoelectric tetracycline, agitated three hours and filtered. The cake was washed with n- butanol and water, an air-dried. There was obtained 11.52 grams of tetracycline base, assaying 745 mcg./mg.

*Example III*

To 6 liters of whole tetracycline broth, at the harvest pH (6.0), were added 250 grams of diatomaceous earth. The mixture was filtered, the cake washed with water, then slurried in 5 liters of water. The mixture was acidified to pH 2.0 with sulfuric acid, agitated 15 minutes, and filtered. The cake was washed with water, and the wash added to the extract. 70 ml. of Arquad 16 were added to the pooled extract and wash, the mixture was adjusted to pH 8.5 with 10 N sodium hydroxide, agitated 15 minutes and filtered. The cake was washed with water, then slurried in 350 ml. of water and the mixture acidified to pH 1.5 with sulfuric acid, agitated 15 minutes and filtered. The cake was washed with water, and the wash added to the extract. The pooled wash and extract was adjusted to pH 3.8 with ammonium hydroxide, seeded with crystalline isoelectric tetracycline, agitated 2½ hours and stored overnight in the refrigerator. The mixture was filtered, the cake washed with n-butanol and water, and air dried. There was obtained 13.92 grams of tetracycline base, assaying 655 mcg./mg.

*Example IV*

60 ml. of Arquad 16 was added to 30 liters of tetracycline acid mash filtrate. The mixture was adjusted to pH 8.5 with sodium hydroxide, agitated 15 minutes and filtered with 300 grams of diatomaceous earth. The cake was washed with water, then slurried in 500 ml. of water and the mixture acidified to pH 1.5 with sulfuric acid. The mixture was agitated 15 minutes and filtered. The cake was washed with water, and the wash added to the extract. The pooled wash and extract was adjusted to pH 3.0 with ammonium hydroxide, seeded with crystalline isoelectric tetracycline, and further adjusted to pH 4.0 with ammonium hydroxide. The mixture was agitated 3 hours and stored overnight in the refrigerator. The crystalline slurry was then filtered, the cake washed and air dried. There was obtained 15.46 grams of tetracycline base, assaying 888 mcg./mg.

*Example V*

To 6 liters of whole tetracycline broth was added 9 grams of Quaternary O dissolved in 20 ml. ethanol. A filter aid, 50 grams of diatomaceous earth was added, the pH adjusted to 8.5 with sodium hydroxide and the mixture filtered. The cake was suspended in 100 ml. of water adjusted to pH 1.5 with sulfuric acid and filtered. The cake was washed with 25 ml. of water and the wash added to the filtrate. The pooled filtrates were adjusted to pH 5.5 with ammonium hydroxide and stirred for 3 hours. The solids that formed were removed by filtration and air dried. There was obtained 9.0 grams of tetracycline base, assaying 415 mcg./mg.

We claim:

1. The process of decomposing a quaternary ammonium-tetracycline complex selected from the group consisting of a long chain alkyltrimethyl-ammonium chloride-tetracycline complex and a long chain dialkyl-dimethyl-ammonium chloride-tetracycline complex which comprises contacting said complex with an aqueous acid solution at a pH within the range of about 0.5–3, separating the resulting aqueous phase containing the tetracycline, and adjusting the pH of the aqueous phase with alkali to a pH within the range of about 3–7 so as to crystallize tetracycline free base therefrom.

2. The process according to claim 1 in which the quaternary ammonium compound is a mixture of long chain alkyltrimethylammonium chlorides and long chain dialkyldimethylammonium chlorides in which the alkyl groups consist of 90% hexadecyl, 6% octadecyl and 4% octadecenyl.

References Cited in the file of this patent

UNITED STATES PATENTS

| 2,516,080 | Sobin et al. | July 18, 1950 |
| 2,734,018 | Minieri et al. | Feb. 7, 1956 |

FOREIGN PATENTS

| 506,950 | Belgium | Nov. 30, 1951 |

OTHER REFERENCES

Van Dyck et al.: "Antibiotics and Chemotherapy," vol. 2 (1952), pages 184 to 196.

Bird et al.: "Antibiotics and Chemotherapy," vol. 4, No. 7, July 1954, page 750.